United States Patent Office 3,253,453
Patented May 31, 1966

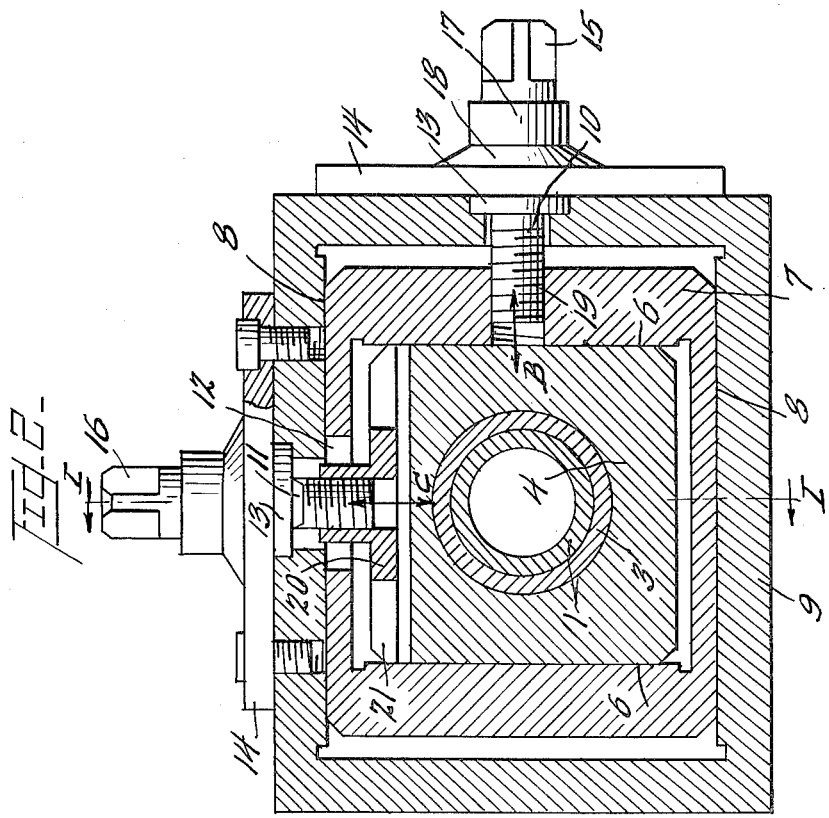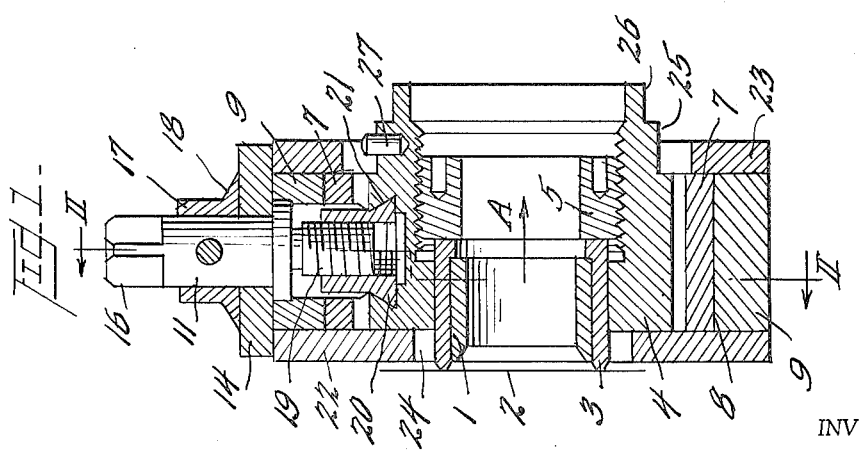
INVENTORS
Karl Schubert
Otto Koch

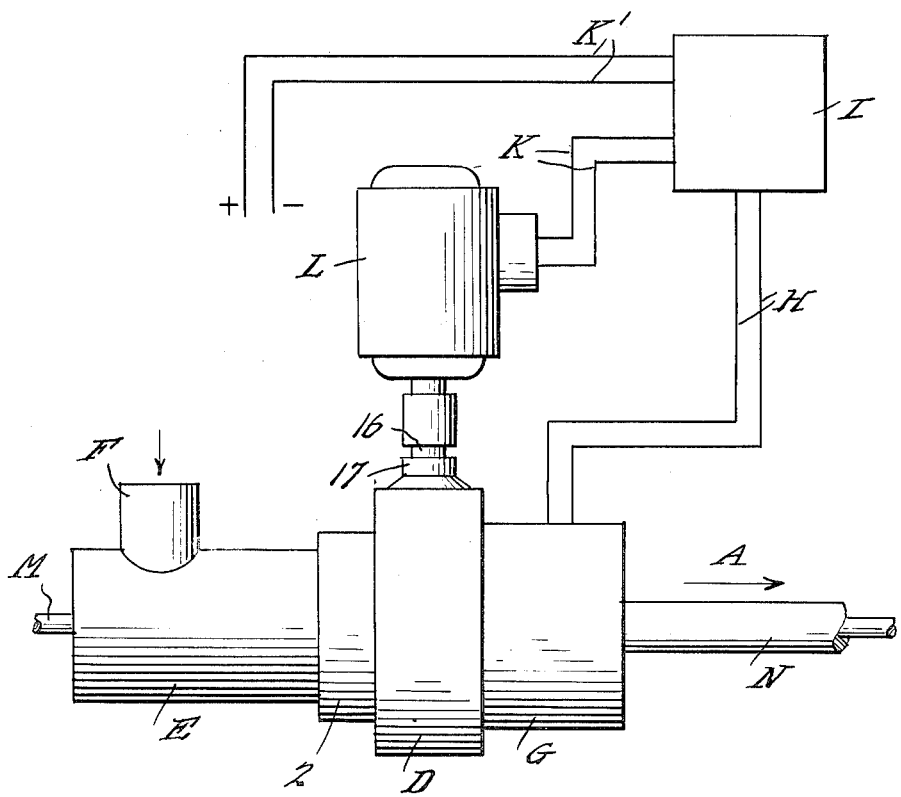

3,253,453
ADJUSTING HEADS FOR NOZZLES FOR
SHEATHING WELDING ELECTRODES
Karl Schubert, Mulvanystrasse 2, Dusseldorf, Germany, and Otto Koch, Knor 6, Monchen-Gladbach-Rheindahlen, Germany
Filed Aug. 27, 1965, Ser. No. 483,267
3 Claims. (Cl. 72—482)

This application is a continuation-in-part of applicants' co-pending application, Serial No. 261,325, filed February 25, 1963, now abandoned.

The invention relates to an adjusting head for nozzles for sheathing welding electrodes, in which the nozzle is arranged in its holder so that it may be adjusted in a plane normal to the longitudinal axis of the nozzle, and is associated with an apparatus for measuring the degree of eccentricity of the electrode relative to its sheath, and operating, for example, electro-inductively.

Such nozzles, adjustable in the dimensions normal to the direction of travel of the electrode, are known. The adjusting mechanism for the nozzle consists either of two eccentrics fitted one into the other, or of adjusting screws perpendicular to one another and arranged in pairs so that the nozzle is firmly held by these screws. However, these adjustments are operated by hand and require much time and very great care. It is also known to associate such nozzles with apparatus for measuring the eccentricity, usually directly connected to the nozzle and operating electro-inductively. Measuring impulses emitted by the measuring apparatus are applied to an indicator showing the eccentricity of the electrode wire relative to the sheathing. If the eccentricity of the wire relative to the sheath or nozzle exceeds a certain maximum value, the nozzle of the known devices must be readjusted by hand until the required concentricity has been obtained. This has the disadvantage that the frequent corrections take up much time and that, in view of the very high modern pressing speeds, the waste rate is very high; moreover, in a number of conventional nozzle adjusting devices, the pressing must be interrupted for the adjustment.

It results from the brief survey given above that the adjustment requires specially trained operators but even these, with all their experience, cannot reliably guarantee the generally satisfactory eccentricity of the welding wire relative to the nozzle. For this reason, as known in the art, there have been many attempts at simplifying the mounting of the nozzle in its holder and to improve it, but these have not yet been capable of replacing the manual adjustment method.

The invention has the object of eliminating the described drawbacks of the known apparatus and of providing a nozzle for sheathing electrodes which is adjusted automatically by means of additional equipment, contrary to the view held by experts. According to the invention, the measuring apparatus for the eccentricity is so coupled with the adjusting mechanism of the nozzle by means of a control apparatus, for example, one or more adjusting motors, that it controls the nozzle adjustment automatically by means of the measuring impulses.

In this way it is possible to adjust the nozzle during the manufacture of the welding electrode immediately after the eccentricity limits have been reached. This is the more important since similar welding wires should be given the most uniform sheathing possible. As shown by comprehensive tests, this is possible only by the continuous and automatic adjustment of the nozzle.

According to a subsidiary feature of the invention, the eccentricity measuring apparatus is easily detachably connected with the nozzle, for example by means of a bayonet lock, so that the measuring apparatus may be detached without difficulties for checking.

In a preferred embodiment, the nozzle is guided in each adjusting direction by a block-shaped slide, one such slide forming the guide for the other slide and the outer slide being guided in a housing. This results in a considerably more reliable nozzle guide than in conventional adjusting mechanisms in which the nozzle is located only, say, by screws, and in which undesirable tilting may occur during the adjustment.

In further development of this principle, a nozzle embodying the invention, adjustable in two normal planes by adjusting spindles, has a single adjusting spindle in each direction of adjustment, connected on the one hand with the housing, and on the other hand, directly or indirectly, and positively, with the guide slide associated with the corresponding adjusting direction. The outer guide slide has a cavity for the adjusting spindle acting on the inner slide. In this way, the nozzle may be adjusted in any direction by a single spindle, and this provides the necessary conditions for an adjusting device which operates reliably and automatically. With known comparable adjusting devices and adjustment of the nozzle requires always first the slackening of the adjusting screw located in the direction of the adjustment and then the shifting of the nozzle by means of the corresponding adjusting screw on the other side. After the termination of the adjustment, all screws must again be tightened in order to fix the nozzle in position.

The adjusting spindles are also connected preferably by a thread with the slide blocks, or directly with the guide slide, and held in the housing by an annular flange. Furthermore, according to the invention, the adjusting spindles connected with the control apparatus for example, with the adjusting motor, are equipped with an additional manual adjustment and preferably with a device indicating the adjustment.

The invention will be further described with reference to an embodiment shown in the drawing, in which:

FIG. 1 is a cross-section of the nozzle adjusting head taken along the line I—I in FIG. 2 in the direction of the arrows, FIG. 2 is a cross-section taken along the line II—II in FIG. 1 in the direction of the arrows, and FIG. 3 is a diagrammatic view of the system.

The embodiment shown in the drawings has a main nozzle 1, pointing towards flow direction A of electrode wire, a feed apparatus for the electrode wire and for the sheathing material, and preferably also a subsidiary nozzle 2, indicated diagrammatically, located in a nozzle holder 3, which is mounted in turn in a crank-shaped inner slide 4. This slide 4 contains also, adjacent the main nozzle 1 and co-axial therewith, an annular nut 5 screwable on a thread, cut in slide 4 whereby the main nozzle 1, or the nozzle holder 3, is held axially without clearance against the subsidiary nozzle 2.

The inner slide 4 is guided in direction C (FIG. 2), normal to the longitudinal axis of the nozzle, in guides 6 of an outer, also slide block-shaped slide 7, guided in turn in direction B (FIG. 2), normal to the direction of movement C of the inner slide 4, in guides 8 of a housing 9. Owing to the nesting of the slides, the nozzle may be adjusted in a plane normal to the longitudinal axis of the nozzle in the two directions B and C, normal to each other. The length of the guides 6, 8 is such that the slides have sufficient clearance in the direction of adjustment.

In the housing 9, there are arranged two adjusting spindles normal to one another, of which one, the adjusting spindle 10, acts on the outer slide 7 and the other, adjusting spindle 11, acts on the inner slide 4. To prevent the latter from being obstructed by the outer slide 7, there is an orifice 12 in slide 7 at the point where the adjusting spindle 11 passes through. The orifice 12 is so dimensioned that the adjusting spindle 11 has a sufficient freedom of movement.

In the embodiment shown each adjusting spindle 10, 11 has an annular flange 13 which is located in corresponding recesses of the housing 9. Towards the outside, these recesses are covered by plates 14, screwed to the housing 9 so that the adjusting spindles 10, 11 are positively located in the housing 9.

The outer ends 15, 16 of the spindles 10, 11 are so formed, for example having a square end, that they may be easily connected to adjusting motors, not shown. Preferably, each spindle has an adjusting ring 17 which may also be equipped with a graduated scale ring 18. The counter scale is located conveniently on the associated plate 14.

The inner ends of the spindles 10, 11 associated with the slides 4, 7, are threaded. The mating thread is here provided, for adjusting spindle 10 in the outer slide 7 so that this adjusting spindle acts directly on this slide. In the case of the other spindle 11, acting on the inner slide 4, it is not possible to provide a co-operating thread in slide 4 because this inner slide is adjustable by the outer slide 7 perpendicularly to its adjusting spindle 11. A mating thread is however provided in a slide block 20, slidably connected through a dovetail guide 21 with the inner slide 4 so that the movement of the spindle 11 is transmitted to the inner slide 4, irrespective of any lateral movement of this slide.

Viewed in the longitudinal direction of the nozzle, the housing 9 is covered by two plates 22, 23 which also serve to support the slides 4, 7 in this direction. At the point where the main nozzle 1 and the nozzle holder 3 pass through the plate 22, the latter has a hole 24 of a size sufficient to allow for the allowable adjusting travel of the nozzle. The same is the case with the plate 23 through which passes the inner slide 4 which requires sufficient clearance. At this point, the inner slide 4 is provided with pass fits 25, 26, serving to receive the eccentricity measuring head. Within the zone of the pass fit 25, a pin 27 is so arranged that the eccentricity measuring head may be connected by a bayonet lock with the inner slide 4.

The eccentricity measuring head, not shown, which follows all movements of the inner slide and therefore also of the main nozzle, operates preferably electro-inductively, and transmits a measuring impulse to a conventional eccentricity measuring apparatus which indicates the degree of eccentricity of the moving electrode wire relative to the main nozzle, or its sheathing, respectively. The eccentricity measuring apparatus controls through the adjusting motors the adjusting spindles so that the eccentricity is continuously balanced by the adjustment of the main nozzle.

This automatic adjustment of the nozzle has considerable advantages because it can be effected within very short periods during the running of the machine, and because it reduces the amount of eccentrically sheathed electrodes to a minimum which could not hitherto be obtained.

The invention is not restricted to the embodiment described above. It can be applied also to other means of adjustment, and especially to those not operating within a Cartesian system of co-ordinates, but using, say, a polar co-ordinate system. Also, the eccentricity measuring head and the measuring apparatus may be combined to form one unit and may be so coupled by any other control members to the nozzle adjusting device that the nozzle is adjusted automatically.

FIG. 3 shows diagrammatically the entire system for sheathing welding electrodes in which M indicates the uncoated electrode wire and N shows the completed and sheathed electrode which has passed through the machine and through the guiding inlet E, the nozzle 2, the adjusting head D and the eccentricity measuring head G. The feed inlet F is provided at the top of the guiding inlet E to introduce the sheathing material and the arrow immediately above indicates the direction of entry of the material which forms the sheathing N which issues at the righthand end of the device as indicated by the arrow A. Above the adjusting head D there is provided an adjusting ring 17 around the spindle head 16 and an electric motor L is provided connected at 16 to the outer end of the spindle 11 with the adjusting ring mounted just above the head D. Wires K and K' are electric conduits connected to the control means I and the electric wires H are connected from the control means I to the concentricity measuring means G. The operation of the system is obvious from the foregoing description.

We claim:

1. An adjusting head for nozzles for sheathing welding electrodes for automatic control comprising a casing having two spaced parallel linear first guides, a slide block slidably guided between said first guides for reciprocal movement and having two spaced parallel linear second guides disposed perpendicularly to said first guides, a second slide block slidably guided between said second guides for reciprocal movement perpendicularly to the reciprocal movement of said first-mentioned slide block, said second slide block having an opening therein, a nozzle having a longitudinal axis and being secured in said opening, said axis being perpendicular to said reciprocal movements of said first-mentioned and said second slide block, a first spindle parallel to said first guides and rotatably supported by said casing and positively connected with said first-mentioned slide block, a second spindle parallel to said second guides rotatably supported by said casing and positively connected with said second slide block, said first-mentioned slide block having a clearance for said second spindle for acting on said second slide block during the reciprocal movement of said first-mentioned slide block, and means for rotating said first and second spindles.

2. An adjusting head according to claim 1, in which the guides provided for said second slide block are disposed at right angles to said first guides of said casing, and in which a third slide block is provided positively and slidably guided in said second slide block for a reciprocal movement parallel to the reciprocal movement of said first-mentioned slide block, said second spindle being positively connected with said third slide block.

3. An adjusting head for nozzles for sheathing welding electrodes for automatic control, comprising a casing having two spaced parallel linear first guides, a first slide block slidably guided between said first guides for a reciprocal movement and having two spaced parallel linear second guides disposed perpendicularly to said first guides, a second slide block slidably guided between said second guides for a reciprocal movement perpendicularly to the reciprocal movement of said first slide block, said second slide block having an opening therein, a nozzle secured in said opening said nozzle having a longitudinal axis being perpendicular to said reciprocal movements of said first and said second slide blocks, a first spindle parallel to said first guides and being on the one end rotatably and axially fixed on said casing and on the other end positively connected with said first slide block by a threaded section, said second slide block having positive third guides disposed parallel to said first guides of said casing, a third slide block positively and slidably guided by said third guides for a reciprocal movement parallel to the reciprocal movement of said first slide block, a second spindle parallel to said second guides and being on the one end rotatably and axially fixed on said casing and on the other end positively connected with said third slide block, said first slide block having a clearance for said second spindle for acting on said third slide block during the reciprocal movement of said first slide block, and means for rotating said first and said second spindle.

References Cited by the Examiner

UNITED STATES PATENTS

| | | | |
|---|---|---|---|
| 2,222,597 | 11/1940 | Solger | 72—481 |
| 2,293,613 | 8/1942 | Morgan et al. | 72—481 |
| 2,526,237 | 10/1950 | Johnson | 205—25 |

FOREIGN PATENTS 590,957  1/1960  Canada.

CHARLES W. LANHAM, *Primary Examiner.*

H. D. HOINKES, *Assistant Examiner.*